Figure 1:
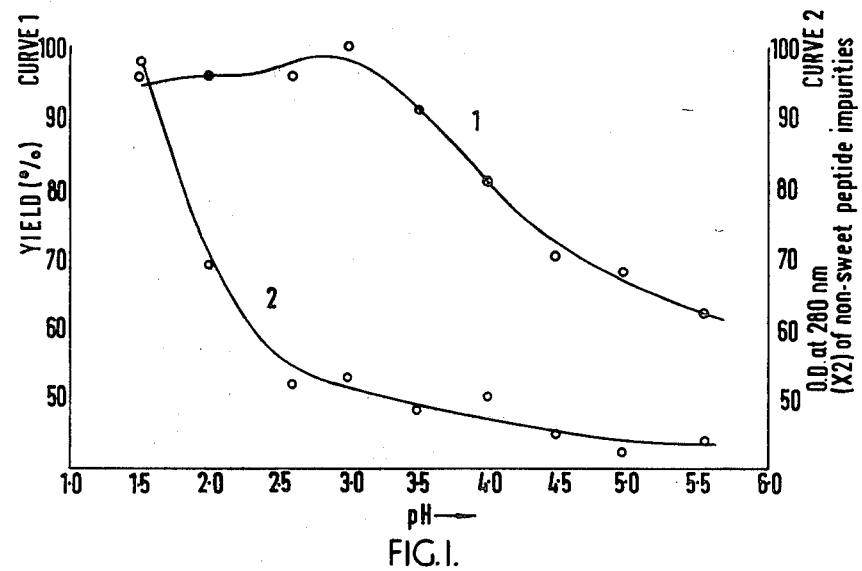

United States Patent [19]

Daniels et al.

[11] 4,221,704

[45] Sep. 9, 1980

[54] EXTRACTION OF THAUMATIN

[75] Inventors: Michael J. Daniels, Reading; John D. Higginbotham, Beech Hill, NR. Reading, both of England

[73] Assignee: Talres Development (N.A.) N.V., Curacao, Netherlands Antilles

[21] Appl. No.: 16,344

[22] Filed: Feb. 28, 1979

[30] Foreign Application Priority Data

Mar. 1, 1978 [GB] United Kingdom ................ 8111/78

[51] Int. Cl.$^2$ ............................................. A23J 1/00
[52] U.S. Cl. ................................ 260/112 R; 426/385; 426/431; 426/473; 426/482; 426/548; 426/656
[58] Field of Search ............... 426/615, 431, 548, 655, 426/656, 481, 482, 518, 472, 473, 506, 455, 385; 260/112 R

[56] References Cited

U.S. PATENT DOCUMENTS

| | | | |
|---|---|---|---|
| 3,682,880 | 8/1972 | Brouwer et al. | 426/548 |
| 4,011,206 | 3/1977 | Higginbotham | 426/548 |

Primary Examiner—S. Leon Bashore
Assistant Examiner—Peter Chin
Attorney, Agent, or Firm—Ostrolenk, Faber, Gerb & Soffen

[57] ABSTRACT

A process for the extraction of thaumatin from the fruit of *T. daniellii*, comprises the steps of skinning the fruit, drying the pulp and mechanically separating the arils from the remainder of the fruit, powdering or otherwise comminuting the dried aril and extracting the resultant powder with water in the absence of added salts while maintaining the pH in the range 2.0 to 4.5. The drying of the skinned fruit is advantageously a freeze-drying process.

9 Claims, 2 Drawing Figures

EXTRACTION OF THAUMATIN

This invention relates to the extraction of the sweet substance thaumatin from *Thaumatococcus daniellii* Benth.

The sweet principle known as thaumatin is derived from the fruit of the tropical plant *T. daniellii* which grows in various parts of tropical Africa. The fruit is trigonal, approximately 4 cm in diameter and contains up to three large black seeds each having a white or light yellow aril at its apex surrounded by a transparent jelly. The arils are intensely sweet and the protein sweetener thaumatin can be extracted from the arils or fruit containing them by aqueous extraction procedures.

Conventionally, the fruit is ruptured and extracted with water or a dilute aqueous buffer. The pH of the system is either uncontrolled, in which case a solution pH of about 6 to 7 is obtained, or alternatively, a dilute buffer is used to keep the pH at a constant value near to neutrality. However, the addition of salts to the extraction solution can be undesirable since the salts subsequently have to be removed when the sweetener is purified.

In our British Patent Specification No. 1,501,409, we have described and claimed an alternative extraction process in which the fruit, or a portion thereof containing the sweet protein, is extracted with a dilute aqueous solution of an aluminium salt. Such a process gives an extract which is mildly acidic (pH about 3.5) and which apparently contains an aluminium adduct of the sweetener.

We have now found that if the arils are separated from the remainder of the fruit, water can be used as an extractant at a pH value which is maintained acid. Such an extraction procedure enables rapid extraction of the available sweet protein to give an extract which is substantially free of salts.

We have found that when the fruit of *T. daniellii* is skinned and dried, the aril can be mechanically separated from the remainder of the fruit, and in particular can be separated from the jelly which causes considerable problems during extraction. The arils are otherwise particularly difficult to separate from the fruit and jelly and thus this method of obtaining the free aril is of considerable importance. Furthermore, we have found that use of acid pH values during extraction of whole fruit is undesirable, as substantial quantities of unwanted fruit components are extracted and/or precipitated.

According to the present invention, therefore, we provided a process for the extraction of thaumatin from fruit of *T. daniellii*, comprising the steps of skinning the fruit, drying the pulp and mechanically separating the arils from the remainder of the fruit, powdering or otherwise comminuting the dried aril and extracting the resultant powder with water in the absence of added salts while maintaining the pH in the range 2.0 to 4.5.

The skinned fruit is advantageously dried by a freeze drying process, whereby a residual moisture content of, for example, 9 to 17% can be obtained. Under these conditions, the arils are brittle and can be simply removed from the remainder of the fruit by agitation and screening. Substantially all the gel remains adhering to the seeds. The material obtained by this process is a dry particulate solid which can be further ground, if necessary, to provide a powder.

The extraction with water can be effected in any suitable way, for example, by stirring the powder with the water or by pumping water through a fixed bed of powder. Throughout the extraction process, the pH of the water is monitored and is kept at the required pH by addition of a food grade mineral acid, preferably hydrochloric acid.

As indicated, the pH should be within the range of 2.0 to 4.5, preferably in the range of 2.5 to 3.5, and most preferably from 2.7 to 3.0.

At pH values above 4.5, the yield of sweetener extracted is relatively low, even after an extended time of extraction, while at pH values lower than 2, the amount of non-sweet impurities extracted, in particular peptides, becomes undesirably large. The optimum yield of sweetener is obtained at a pH of about 2.7 to 3.0, at which pH the amount of non-sweet material extracted is relatively low.

The extraction may be effected at any convenient temperature consistent with the stability of the protein. Naturally, low temperatures should be avoided because the yield is reduced. In practice, we have found that the optimum temperature for the extraction lies in the range 20° to 45° C., preferably within the range 30° to 42° C. The most preferred temperature is about 40° C.

Using the method of this invention, at the optimum pH and temperature, it is possible to extract substantially all the available sweetener in a short time. Continued extraction does not increase the yield significantly and it is a particular advantage of the process according to the invention, that maximum yields are obtained in relatively short times.

After extraction, the aqueous solution obtained is preferably ultra-filtered and freeze dried to yield thaumatin of high sweetness and good purity. Extraction at the optimum pH of 2.7 to 3.0 has the additional advantage that ultra-filtration can be effected directly on the extract obtained without subsequent pH adjustment. Very low pH values are unsuitable for conventional ultra-filtration membranes and any raising of the pH of the extract could lead to precipitation and would, in any event, introduce unwanted salts into the system.

The relationship of pH to efficiency of extraction is illustrated in the attached FIG. 1 in which yield, as a percentage of the maximum sweetener extracted, is plotted against pH. Curve 1 illustrates the optimum extraction efficiency at a pH of around 2.7 and the rapid decrease in efficiency with increasing pH.

Curve 2 shows the optical density at 280 nm ($\times 2$) of non-sweet peptide impurities extracted with the thaumatin. It will be seen that below pH 2 the level of impurities rises sharply, leading to impure extracts which must be further purified.

Figure 2:
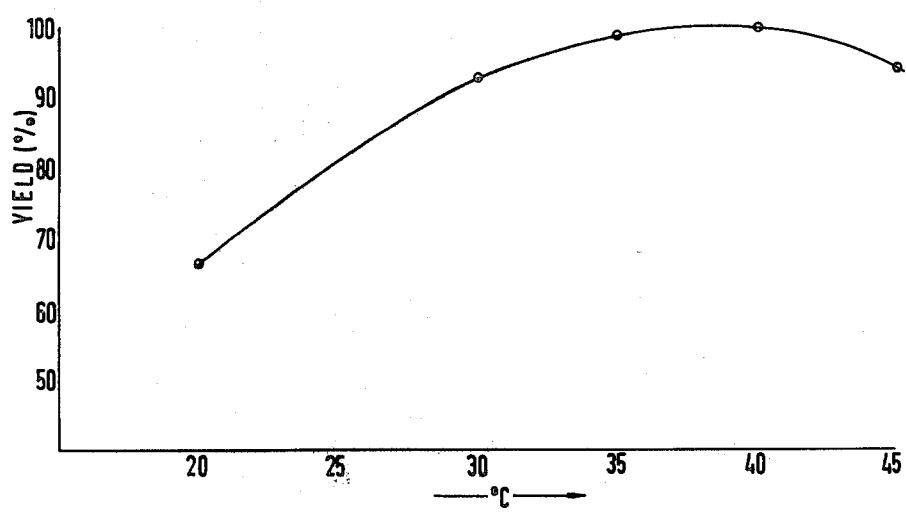

The attached FIG. 2 shows the relationship of temperature to yield at an extraction time of five minutes at pH 2.7. It will be seen that the optimum temperature is about 40° C.

The following examples illustrate the invention.

EXAMPLE 1

Fresh fruit of *T. daniellii* were skinned, frozen and freeze dried until the arils were brittle (residual moisture content about 12%). The freeze dried fruit was then mechanically agitated and the brittle arils became separated from the remainder of the fruit and also became broken into smaller particles. The solids were then sieved to separate the aril particles from the seeds and unbroken fruit portions, substantially all the gel remaining bound to the seeds. The aril particles were then ground to a powder.

100 mg portions of the powder were accurately weighed and extracted by vigorous stirring (magnetic stirrer) for three minutes in 40 ml aliquots of distilled water. The pH of the aliquots was maintained constant at a figure of, respectively, 1.5, 2.0, 2.7, 3.0, 3.5, 4.0, 4.5 and 4.95. The initial pH of each aliquot was 4.95. In a controlled experiment with no pH maintenance, the pH rose during the extraction to 5.76. Each extract was rapidly filtered under vacuum on a Buchner funnel and a 0.25 ml sample was subjected to gel filtration. The amounts of thaumatin extracted were plotted against pH as shown in FIG. 1, the maximum yield being taken as 100%. The maximum yield amounted to 32.5% of the total weight of the freeze-dried aril powder.

EXAMPLE 2

Freeze dried aril powder, obtained as in Example 1, (100 mg) was vigorously agitated with distilled water (40 ml) at 40° C. for five minutes. During the extraction the pH was maintained at 2.7 by addition of dilute aqueous hydrochloric acid. The extract was then filtered and dialysed and the permeate was analysed as in Example 1. The yield of thaumatin amounted to 33.4% of the total weight of the freeze-dried aril powder.

We claim:

1. In a process for the extraction of thaumatin from fruit of *T. daniellii* in which the thaumatin is extracted with an aqueous extractant and the thaumatin is thereafter isolated, the improvement comprising the steps of skinning the fruit, drying the pulp and mechanically separating the arils from the remainder of the fruit, comminuting the dried aril and extracting the resultant powder with water containing an additive selected from food grade acids only in the absence of added salt, while maintaining the pH in the range of from 2.0 to 4.5.

2. The process of claim 1 in which the pulp is freeze-dried.

3. The process of claim 1 in which the extraction is effected at a pH of 2.5 to 3.5.

4. The process of claim 3 in which the pH is 2.7 to 3.0.

5. The process of claim 1 in which the extraction is effected at a temperature of from 20° to 45° C.

6. The process of claim 5 in which the temperature is 30° to 42° C.

7. A process for the extraction of thaumatin from the fruit of *T. daniellii* in which the fruit is skinned, the pulp is freeze-dried and the arils are mechanically separated from the remainder of the fruit and powdered; the powdered arils are extracted with water containing a food grade acid as the only in the absence of added salt additive, while the pH is maintained within the range of 2.7 to 3.0, the extraction being effected at a temperature of about 40° C., the thaumatin extract being subsequently processed to isolate the thaumatin.

8. The process of claim 7 wherein said subsequent processing to isolate the thaumatin comprises ultra filtration and freeze-drying.

9. The process of claim 1 wherein the extracted thaumatin is ultra filtrated and freeze-dried.

* * * * *